US008209266B2

(12) United States Patent
Wormald et al.

(10) Patent No.: US 8,209,266 B2
(45) Date of Patent: Jun. 26, 2012

(54) SYSTEM AND METHOD FOR BLOCKING OBJECTIONABLE COMMUNICATIONS IN A SOCIAL NETWORK

(75) Inventors: Chris Wormald, Kitchener (CA); Raymond Reddy, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 395 days.

(21) Appl. No.: 12/392,121

(22) Filed: Feb. 25, 2009

(65) Prior Publication Data
US 2010/0217721 A1    Aug. 26, 2010

(51) Int. Cl.
G06Q 99/00    (2006.01)
G06Q 10/00    (2012.01)
(52) U.S. Cl. .......................................... 705/319; 705/1.1
(58) Field of Classification Search .................. None
See application file for complete search history.

(56) References Cited

U.S. PATENT DOCUMENTS

| | | | |
|---|---|---|---|
| 7,752,251 B1* | 7/2010 | Shuster et al. | 709/200 |
| 7,840,576 B1* | 11/2010 | Siegel et al. | 707/755 |
| 7,870,209 B2* | 1/2011 | Brochu et al. | 709/206 |
| 2005/0256929 A1* | 11/2005 | Bartol et al. | 709/206 |
| 2007/0106551 A1 | 5/2007 | McGucken | 705/10 |
| 2007/0266097 A1 | 11/2007 | Harik et al. | 709/204 |
| 2008/0040673 A1 | 2/2008 | Zuckerberg et al. | 715/745 |
| 2008/0134035 A1 | 6/2008 | Pennington et al. | 715/713 |
| 2008/0189169 A1 | 8/2008 | Turpin et al. | 705/10 |
| 2008/0189188 A1 | 8/2008 | Morgenstern | 705/26 |
| 2008/0189189 A1 | 8/2008 | Morgenstern | 705/26 |
| 2008/0189380 A1* | 8/2008 | Bosworth et al. | 709/207 |
| 2008/0189768 A1 | 8/2008 | Callahan et al. | 726/4 |
| 2008/0281622 A1* | 11/2008 | Hoal | 705/1 |
| 2009/0094187 A1* | 4/2009 | Miyaki | 707/1 |
| 2009/0177670 A1* | 7/2009 | Grenier et al. | 707/100 |

* cited by examiner

Primary Examiner — Jonathan Ouellette

(57) ABSTRACT

A system and method blocks objectionable communications in a social network. A first user of the social network determines when communications from a second user to the first user that are displayed and viewed by third party users of the social network are objectionable. In response, the first user blocks further display of communications from the second user to the first user that were intended by the second user to be displayed and viewed by third party users of the social network.

25 Claims, 4 Drawing Sheets

SOCIAL NETWORK SITE | HOME
300a ⟶

 WHAT ARE YOU DOING NOW?

 FIND PEOPLE YOU KNOW

NEWS FEED
   STATUS   UPDATES   PHOTOS
   LIVE FEED               LINKS

JOHN DOE IS GOING TO THE
CIRCUS ON FRIDAY

--COMMENT--

WRITE A COMMENT......

OPTIONS FOR NEWS FEED

PENALTY BOX — 304
YOU HAVE PLACED JOHN DOE
IN THE PENALTY BOX — 302
REMOVE?
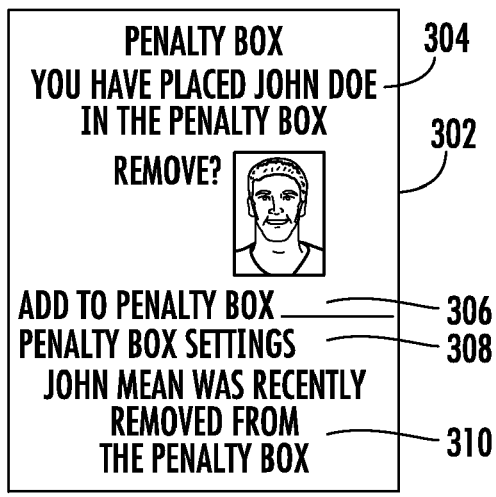
ADD TO PENALTY BOX — 306
PENALTY BOX SETTINGS — 308
JOHN MEAN WAS RECENTLY
REMOVED FROM
THE PENALTY BOX — 310

300

JOHN SMITH | LOG OUT | ONLINE FRIENDS 0
                      JOE FRIEND
                      LARRY FRIEND

REQUESTS
   1 FRIEND SUGGESTION
   1 FRIEND REQUEST

APPLICATIONS
   PHOTOS     VIDEO
   GROUPS     EVENTS
   NOTES      LINKS

SPONSOR
| 800 | YOU HAVE A GREAT CREDIT SCORE BORROW MORE MONEY!! |

300b

PEOPLE YOU MAY KNOW

 CURLY CUE
        ADD AS FRIEND

 SUSIE CUE
        ADD AS FRIEND

*FIG. 3*

SYSTEM AND METHOD FOR BLOCKING OBJECTIONABLE COMMUNICATIONS IN A SOCIAL NETWORK

TECHNICAL FIELD

The present disclosure relates to the field of communications systems, and more particularly, to communications in a social network.

BACKGROUND

Social networking sites, for example, Facebook™, MySpace™, and similar social network sites as well as Instant Messaging systems, online chat room and bulletin boards, often have private and public communications that are viewable not only by the immediate users, but also by third party users of the social network or Instant Messaging system. These users could be approved or designated friends by a first user to communicate and view other communications from similarly designated friends.

Often in a social network site or Instant Messaging system, a rogue user will write or text an inappropriate message or do an annoying action, such as engaging in an incorrect "poke" to annoy a user or publicly post an unsavory comment about the user.

For example, a first user could have a message wall as in Facebook™ in which the communications from a second user to the first user are displayed and can be viewed by third party users of the social network. The second user may post on this wall inappropriate or objectionable messages. If the messages are private messages only intended for the first user, then the first user may not be overly bothered. If the messages are public messages to be viewed by others such as the third party users, however, then the first user may consider these messages inappropriate for public consumption. Similar instances can occur in an Instant Messaging system in which messages from a second user to the first user are inappropriate and the first user does not want other third party users to see the inappropriate messages and inappropriate content.

One technical solution to this problem of inappropriate messages being posted by the second user on the wall of the first user is to no longer designate the second user as a friend. When this occurs, the second user may not view or post messages on the wall of the first user. This solution could have issues if the second user as a friend is a family member or long-standing close friend who only needs the inappropriate behavior modified in an appropriate manner while discontinuing any public posting of such inappropriate messages and communications.

BRIEF DESCRIPTION OF THE DRAWINGS

Other objects, features and advantages of the present invention will become apparent from the detailed description which follows, when considered in light of the accompanying drawings in which:

FIG. 3 is a representation of a social network site user interface showing a penalty box as a non-limiting example.

DETAILED DESCRIPTION

Figure 1:
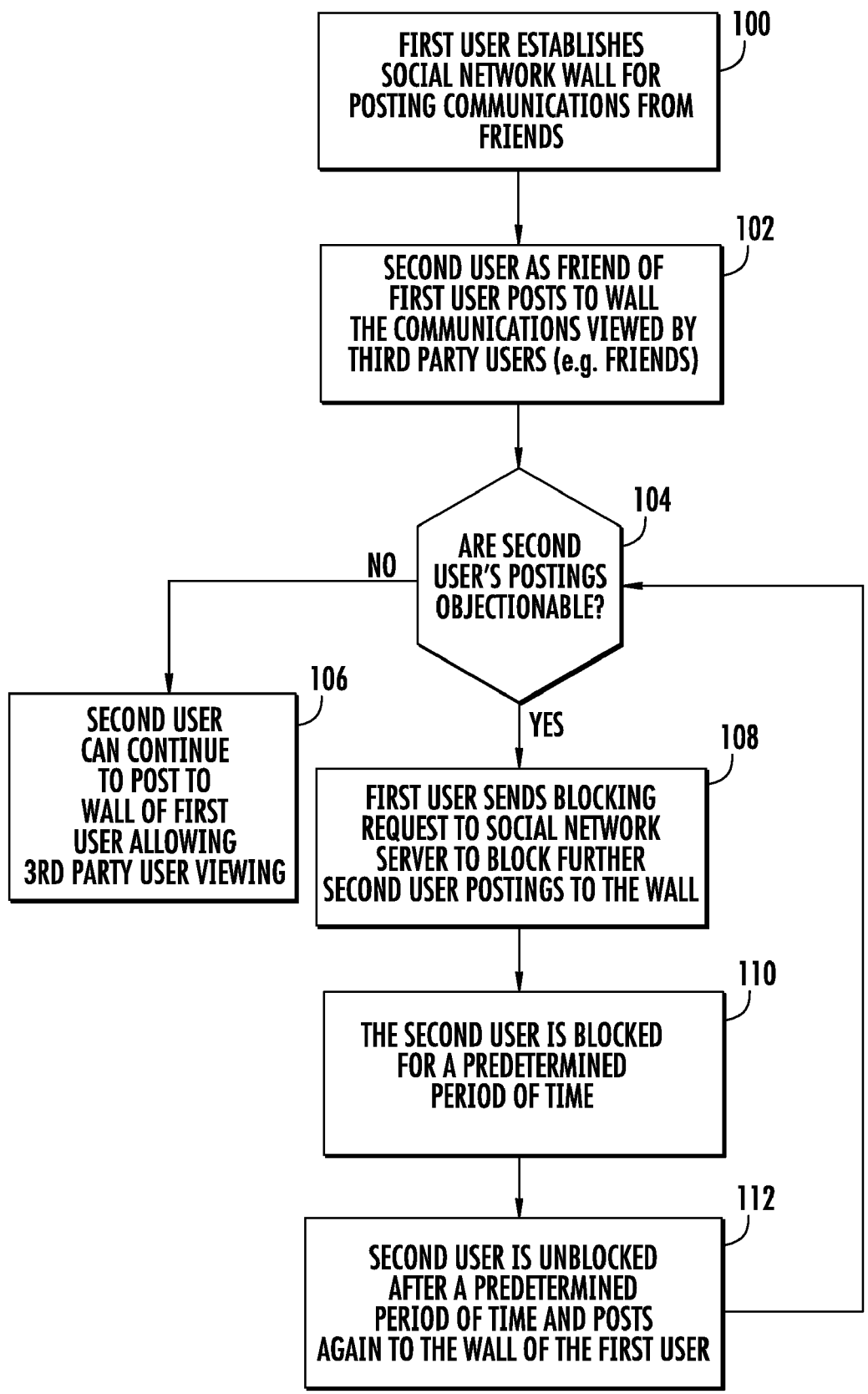
FIG. 1 is a flow diagram illustrating basic aspects of a method for blocking objectionable communications in a social network or similar communications network in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Generally speaking, a method and system, in accordance with non-limiting examples, blocks objectionable communications in a social network or other similar communications network such as an Instant Messaging network where a second user communicates with a first user such as by communications posted on a wall to be viewed by other third party users of the system. These users could all be designated friends. The social network communications could also refer to wall posting and Instant Messaging. In one aspect, a first user of the social network determines when communications from a second user to the first user that are displayed and viewed by third party users of the social network are objectionable. In response, the first user blocks further display of communications from the second user to the first user that were intended by the second user to be displayed and viewed by third party users of the social network.

The second user is typically an approved user designated by the first user to display communications to the third party users. The approved second user is typically a friend designated by the first user. Third party users typically also are approved users designated by the first user, and typically are designated as friends in some social networks, such as Facebook™ as a non-limiting example.

In one aspect, the communications system includes a social network server that is configured to provide a user interface for the social network communications and allow the first user to receive the communications from the second user that are displayed and viewed by third party users of the social network. A communications module can communicate with the first and second users and the third party users such as through a communications network, e.g., an internet, and receive a blocking request from the first user and communicate the blocking request to the social network server for blocking further display to the third party users of communications from the second user to the first user that are intended to be displayed and viewed by third party users.

It is possible to display any further communications from the second user only to the first user, while blocking further display of those communications to the third party users. These communications from the second user to the first user could include communications posted on a wall of the first user or texting by Instant Messaging. In one aspect, the second user can be blocked for a predetermined period of time. This allows further display of communications from the second user to the first user to be viewed by the third party users after the predetermined period of time has passed. In another aspect, an indication can be sent to the second user that the communications to the first user that are intended to be displayed to other third party users has been blocked and can no longer be viewed. This indication could be an indication that the second user has been placed in a penalty box status. Graphics could be established from the social network server to be viewed on user displays, such as on a personal computer or portable wireless communications device, showing a penalty box status. The graphics could be public or private, making the penalty box status a private or public punishment depending on what action is desired by the first user.

The communications between first and second users could be Instant Messaging communications as part of a social network or as part of another Instant Messaging communications system. A computer readable medium is also set forth.

FIG. 1 is a high-level flowchart of an example of a method used for blocking objectionable communications in a communications network such as the example social network described above. As shown, a first user establishes a social network wall for posting and viewing communications from friends (block 100). Certain users are designated as friends by the first user. These friends can post to the wall. A second user as a friend posts communications to the wall of the first user that are viewed by third party users, for example, friends of the first user (block 102). A determination is made whether the communications from the second user are objectionable to the first user (block 104). This determination can be automatic based on predetermined criteria such as preference settings established by the first user. For instance, messages containing a particular word could be automatically determined as objectionable by the social network server. The user can control the objectionable vocabulary through preference settings in a penalty box or other user interface. It is also possible for the first user to make an objection on-the-fly as to the content and communications that are objectionable based on predetermined criteria that the user decides at that moment and in response send a request to the social network server to block communications as explained below. If the communications from the second user are not objectionable, the second user can continue posting communications to the wall of the first user. This allows viewing by the third party users (block 106).

If the communications from the second user, however, are objectionable, the first user sends a blocking request to the social network server to block the second user from posting further communications to the wall of the first user (block 108). It should be understood that blocking requests can be accomplished at the request of the first user or it can be accomplished automatically by the social network server based on the first user's predetermined criteria, such as preference settings. The second user is blocked for a predetermined period of time (block 110), which can vary from a few to 48 hours, for example, to longer periods of time. During that time, the first user may not wish to view any posts from the second user or view additional posts, while third party users cannot view these posts. After the predetermined period of time has lapsed, the second user is unblocked and is allowed to post again to the wall of the first user (block 112). The process then repeats with step 104 and the first user (or server) again determines if the second user's communications are objectionable. Although the process would continue with the blocking and unblocking steps as described, it could be that if on the second repetition the second user's communications are objectionable, the blocking action can occur for a much longer predetermined period of time or the second user can be permanently blocked.

Figure 2:
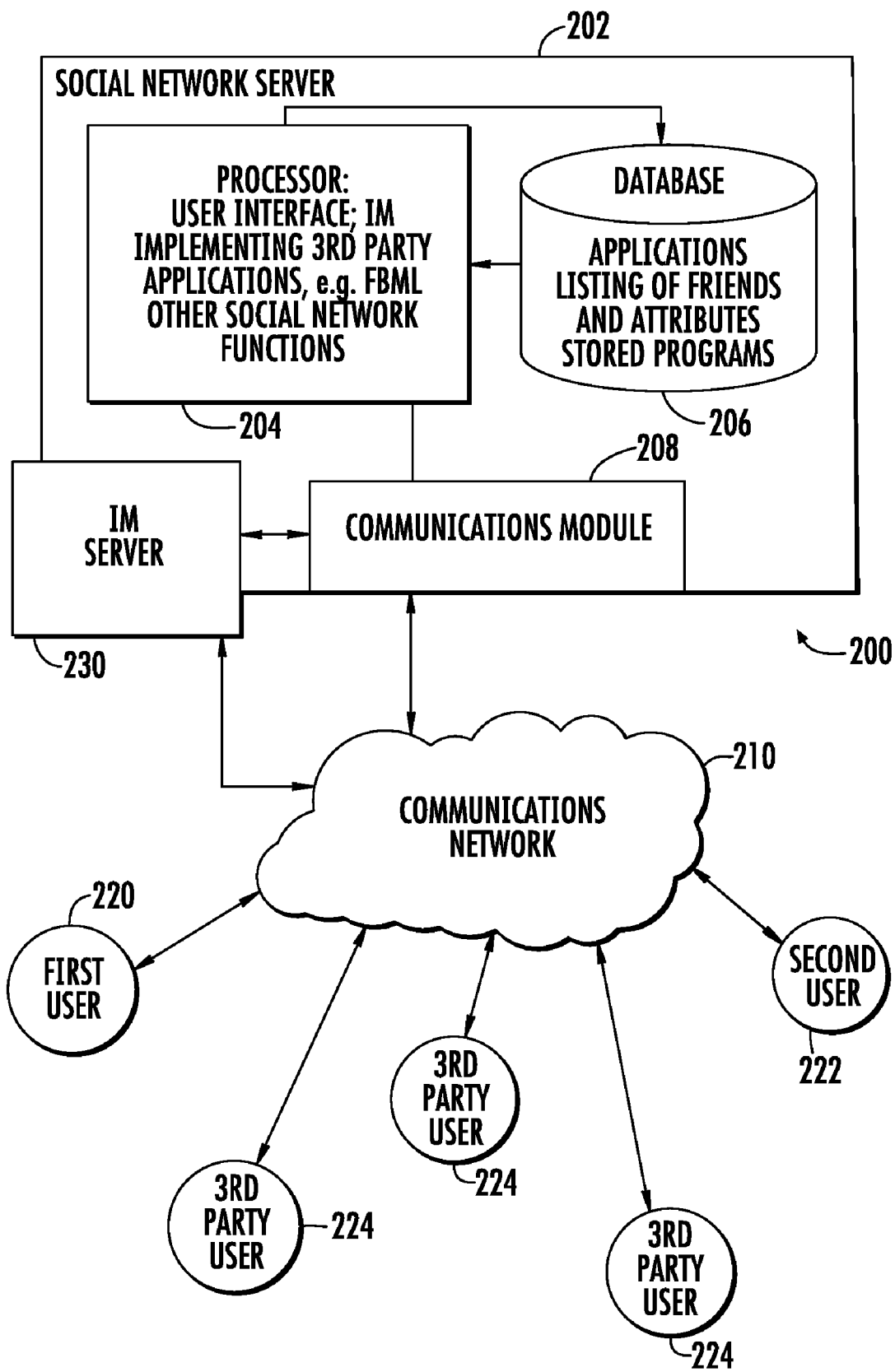
FIG. 2 is a high-level block diagram showing a communications system that includes a social network server with Instant Messaging functionality, a communications network and various first, second and third party users of the social network in accordance with a non-limiting example.

FIG. 2 illustrates a communications system 200, in accordance with a non-limiting example, that can incorporate the method as described relative to FIG. 1. This communications system 200 could be for a social network or Instant Messaging or a combination of both. As illustrated, a social network server 202 includes a processor 204 and associated database 206 and communications module 208. The database 206 can store data relating to various applications that can be drawn upon by users, including third party applications, data relating to the users and friends, data for stored programs and other stored data that can be used in the social network. The processor 204 is operative with the database 206 and the communications module 208 and processes data for a user interface to be used by different users, Instant Messaging applications in one non-limiting example, third party applications, such as Facebook™ mark-up language applications and other social network functions. Data is transmitted to and from different users through the communications module 208 as part of the social network server 202 through the communications network 220 to the first user 210, second user 222 and various third party users 224. The communications network 210 could be a wireless communications network and the different users could use portable wireless communications devices or personal computers as part of their office or business. The communications network 210 could also be a wireless network that communicates with a public switched telephone network.

The social network server 202 could be formed from a plurality of different servers, with each server having one or more processors, one or more databases and one or more communications modules. Load balancing could be used when different servers are employed. It should also be understood that different users can communicate with each other through the communications network and incorporate Instant Messaging functionality using an Instant Messaging server 230 and operating through the communications network to each other. Functionality for a blocking request from a first user can be incorporated into an Instant Messaging server 230 (which could be part of the social network server as illustrated or separate therefrom) and having Instant Messaging functionality.

FIG. 3 shows an example of a user interface that is established by a social network site that transmits data to a user device to display a social network wall depicting a user interface at 300 that includes the various user interactions and display of information for the social network site. For example, the name of the user could be displayed with logout information and a listing of on-line friends such as shown as the top portion at 300a and in this example listing Joe Friend and Larry Friend as "friends." This could be followed by general information such as requests for friend suggestions or friend requests and a line for "what are you doing now." Other applications and news feeds and comments are shown including some advertising by a sponsor shown at 300b.

A penalty box 302 is shown at the bottom left and displays information regarding the users that are placed in the penalty box such that communications to the first user from the second user cannot be posted to third party users and to the first user if the first user elects not to view them. For example, a first data item in the penalty box 302 could be information concerning the identity of the person placed in the penalty box and whether that person should be removed (304). A picture of that person could be displayed. At line 306, any individual that should be added to the penalty box can be listed. Penalty box settings are set at line 308 and the user can use the user interface at line 308 to establish predetermined criteria of what types of communications should be blocked. Line 310 shows basic information concerning which person was recently removed from the penalty box such as John Mean.

It should be understood that the method and system as described typically incorporates software such as part of a social network platform software, for example, a Facebook™ platform, that provides a framework for different third party developers to create applications that interact with the core Facebook™ features. For example, in accordance with non-limiting examples, the blocking feature as described could be incorporated as a third party application that uses the Facebook™ Mark-up Language (FBML) with an extension to HTML. Different tag sets can be supported and used with the blocking feature as described such as different social data tags, sanitization tags, design tags, component tags and control tags.

In one aspect, the Facebook™ Mark-up Language can use the extensions and tags with mark-up tags and procedural tags that include UI elements such that different users can be identified with a UID (User Identifier). Specific users could view communications posted made by a particular second user that has been determined to have inappropriate postings. For example, a graphic could be displayed that appears as a penalty box in which the second user is placed. This graphic could be displayed only to that second user that has been found to post offending messages, or the graphic could be displayed to one or both the first user and second user. If the first user wants a more public humiliation, the graphic for the penalty box with the second user displayed in the penalty box could be displayed also to third party users. Also, an application could be implemented in which the first user could select specific friends or other users with specific UID's to view the penalty box.

One advantageous aspect is the first user deciding when a second user has objectionable behavior or communications in the social network and must be placed in the penalty box. There have been some proposals for curtailing objectionable behavior in a web-based social network in which actions of users of the social network are monitored by the social network system itself for objectionable behavior. In those systems, a policy is determined based on the behaviors and warnings issued. A user's account may be suspended. The social network system itself takes corrective action if a threshold is exceeded. This is different from the system and method as described above in which the first user that has implemented the wall objects to the behavior of a second user and places the second user in the penalty box.

It should be understood that social content can be used with social data tags, which can retrieve and format data to an application or a specific user making a request. An example is the blocking request having data that takes many forms, such as including specific user information, group information or even photos such as of a penalty box. A social data tag can identify and render a user's name in different ways, Sanitization tags can be used with different users that each may have different standards. Some users may want to sanitize or remove certain HTML tags, such as used by a second user that has objectionable behavior. A first user can define specific design tags to define the look of the page of a penalty box. Component tags can be used for allowing user interaction, for example, the second user interacting with one of at least the first user and third party users according to the rules of a penalty box status. For example, only certain types of messages could be posted or messages posted only at certain times of the day. Control tags could be used to allow other users to show content only to the owner of an application profile box. Thus, the penalty box could be hid from other third party users and displayed to the second party user and first party use or just the first party user. Control tags could be used for such a purpose.

Example components of a hand-held mobile wireless communications device 1000 that may be used in accordance the system as described in FIGS. 1-3 is further described in the example below with reference to FIG. 4. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 4:
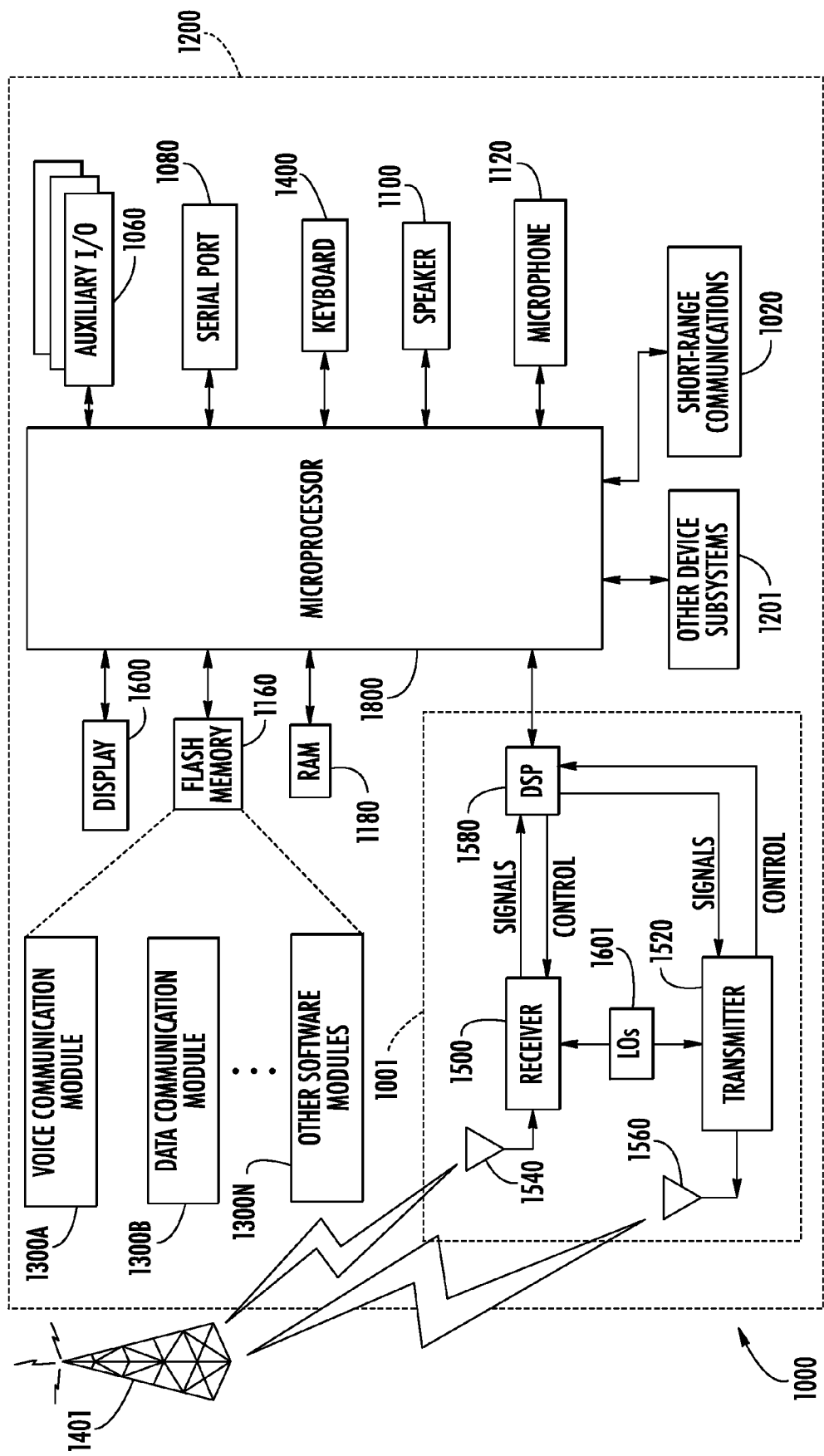
FIG. 4 is a schematic block diagram illustrating example components of a mobile wireless communications device that could be used with the system as described relative to FIGS. 1-3.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIN application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control processes implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the system and method will come to the mind of one skilled in the art having the benefit of the teachings presented in the foregoing descriptions and the associated drawings. Therefore, it is understood that the described system and method are not to be limited to the specific embodiments disclosed, and that modifications and embodiments are intended to be included within the scope of the appended claims.

That which is claimed is:

1. A method for blocking objectionable communications in a social network, comprising:

transmitting data from a communications module of a social network server to communications devices to display a user interface on the communications devices and post communications between a first and second user that are viewed by third party users of the social network;

the social network server determining when communications from the second user that are posted and displayed and viewed by third party users are objectionable based on predetermined criteria established by the first user, and in response, blocking further display of communications from the second user to the first user that can be viewed by third party users; and displaying further communications from the second user only to the first user while blocking display of those communications to the third party users.

2. The method according to claim 1, wherein the second user is an approved user designated by the first user to display communications to the third party users.

3. The method according to claim 2, wherein the approved second user is a friend designated by the first user.

4. The method according to claim 1, wherein the third party users are approved users designated by the first user.

5. The method according to claim 4, wherein the approved third party users are friends designated by the first user.

6. The method according to claim 1, wherein the communications from the second user to the first user comprise posting communications on a wall of the first user.

7. The method according to claim 1, and further comprising blocking the second user for a predetermined period of time and allowing further display of communications from the second user to the first user to be viewed by the third party users after the predetermined period of time has passed.

8. The method according to claim 1, and further comprising indicating to the second user that the communications to the first user that are intended to be displayed to other third party users have been blocked.

9. The method according to claim 8, and further comprising indicating to the second user that the second user has been placed within a penalty box status indicative of the first user blocking the second user.

10. The method according to claim 1, wherein communications between first and second users comprise instant messaging communications.

11. The method according to claim 1, further comprising:
displaying on a user interface of the first user a penalty box indicating that the second user is no longer able to post communications intended from the second user to the first user.

12. A communications system, comprising:
a social network server that is configured to provide a user interface for a social network and allowing a first user to receive communications from a second user that are displayed and viewed by third party users of the social network; and
a communications module that communicates with the first and second users and third party users and receives a blocking request from the first user and communicates the blocking request to the social network server for blocking further display to the third party users of communications from the second user to the first user that are intended to be displayed and viewed by the third party users after the first user has determined that the communications from the second user are objectionable,
said social network server is operative with the communications module for displaying communications from the second user only to the first user while blocking display of those communications to the third party users.

13. The system according to claim 12, wherein the second user is an approved user designated by the first user to display communications to the third party users.

14. The system according to claim 13, wherein the approved second user is a friend designated by the first user.

15. The system according to claim 12, wherein the approved third party users are approved users designated by the first user.

16. The system according to claim 15, wherein the third party users are friends designated by the first user.

17. The system according to claim 12, wherein said social network server is operative for implementing a wall of the first user to which communications from other users of the social network can be posted, wherein the communications from the second user to the first user comprise posting communications on the wall of the first user.

18. The system according to claim 12, wherein said social network server is operative with the communications module for blocking the second user for a predetermined period of time and allowing further display of communications from the second user to the first user to be viewed by the third party users after the predetermined period of time has passed.

19. The system according to claim 12, wherein said social network server is operative with the communications module for indicating to the second user that their communications to the first user and that are intended to be displayed to other third party users have been blocked.

20. The system according to claim 19, and further comprising indicating to the second user that the second user has been placed within a penalty box status indicative of the first user blocking the second user.

21. The system according to claim 12, wherein the communications between first and second users comprise instant messaging communications.

22. A non-transitory computer-readable medium having stored thereon computer-executable instructions for blocking objectionable communications in a social network, comprising:
receiving communications from a second user to a first user that are viewed by third party users of the social network; and
blocking further display of communications from the second user to the first user that were intended by the second user to be displayed and viewed by third party users of the social network after determining that the communications from the second user are objectionable based on predetermined criteria; and
displaying further communications from the second user only to the first user while blocking display of those communications to the third party users.

23. The non-transitory computer-readable medium according to claim 22, wherein said computer-executable instructions are operable for blocking the second user for a predetermined period of time and allowing further display of communications from the second user to the first user to be viewed by the third party users after the predetermined period of time has passed.

24. The non-transitory computer-readable medium according to claim 22, wherein said computer-executable instructions are operable for processing instant messaging communications.

25. A method for blocking objectionable communications in a social network, comprising:
transmitting data from a communications module of a social network server to communications devices to display a user interface on the communications devices and post communications between a first and second user that are viewed by third party users of the social network;
the social network server determining when communications from the second user that are posted and displayed and viewed by third party users are objectionable based on predetermined criteria established by the first user, and in response, blocking further display of communications from the second user to the first user that can be viewed by third party users; and
displaying on a user interface of the first user a penalty box indicating that the second user is no longer able to post communications intended from the second user to the first user.

* * * * *